(12) United States Patent
Correia et al.

(10) Patent No.: US 6,742,987 B2
(45) Date of Patent: Jun. 1, 2004

(54) CRADLE MOUNTED TURBINE NOZZLE

(75) Inventors: Victor Hugo Silva Correia, Milton Mills, NH (US); Robert Alan Jacobson, Andover, MA (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 10/196,454

(22) Filed: Jul. 16, 2002

(65) Prior Publication Data

US 2004/0013519 A1 Jan. 22, 2004

(51) Int. Cl.[7] ................................................. F01D 9/06
(52) U.S. Cl. ..................... 415/189; 415/209.4; 415/191
(58) Field of Search ............................. 415/189, 209.3, 415/209.4, 209.2, 211.2, 191

(56) References Cited

U.S. PATENT DOCUMENTS

| 4,403,917 A | 9/1983 | Laffitte et al. | |
| 4,702,670 A | 10/1987 | Winter | |
| 5,211,536 A * | 5/1993 | Ackerman et al. | 415/177 |
| 5,372,476 A | 12/1994 | Hemmelgarn et al. | |

* cited by examiner

Primary Examiner—Edward K. Look
Assistant Examiner—Kimya N McCoy
(74) Attorney, Agent, or Firm—William S. Andes; Francis L. Conte (57) ABSTRACT

A turbine nozzle includes a row of vanes in corresponding segmented outer and inner bands. The inner band of each segment includes a retention flange. A nozzle support includes forward and aft flanges defining a retention slot receiving the retention flange. The retention flange includes a radial lug trapped axially in the retention slot, and a tangential lug at an opposite circumferential end disposed on the forward flange. The aft flange includes an outer hinge, and the retention flange further includes an inner hinge for cradle mounting the retention flange in the nozzle support.

20 Claims, 5 Drawing Sheets

CRADLE MOUNTED TURBINE NOZZLE

CRADLE MOUNTED TURBINE NOZZLE

The U.S. Government may have certain rights in this invention pursuant to contract number DAAE07-00C-N086 awarded by the U.S. Department of the Army.

BACKGROUND OF THE INVENTION

The present invention relates generally to gas turbine engines, and, more specifically, to turbine nozzles therein.

A gas turbine engine includes a compressor for pressurizing air which is then mixed with fuel in a combustor and ignited for generating hot combustion gases. The combustion gases are discharged from the combustor through a high pressure turbine nozzle which directs the gases to a row of first stage high pressure turbine blades mounted in the perimeter of a supporting disk. The turbine blades extract energy from the gases for rotating the disk and in turn rotating a shaft joined to the compressor.

The gases from the high pressure turbine are then channeled downstream into a low pressure turbine which includes an additional turbine nozzle and corresponding row of turbine blades for extracting additional energy from the gases which is used for producing useful work. For example, the low pressure turbine may be connected to a fan disposed upstream of the compressor in a typical turbofan aircraft engine application. Or, the low pressure turbine may be joined to an output shaft for producing output work in industrial and marine engine applications.

The high pressure turbine nozzle first receives the hot combustion gases from the combustor and must be suitably mounted for ensuring efficient operation of the engine and a suitably long life during use notwithstanding the hostile environment in the high temperature combustion gases. A typical turbine nozzle is formed of arcuate segments including outer and inner bands typically having multiple stator vanes integral therewith. The vanes are hollow for channeling cooling air bled from the compressor during operation.

The outer and inner bands must be suitably mounted to stator elements in the engine while minimizing undesirable flow leakage therethrough which would decrease engine performance during operation. And, aerodynamic and thermal loads and stresses therefrom must be accommodated for ensuring suitable life.

The individual nozzle segments are typically sealed to each other using conventional spline seals, and the outer and inner bands are suitably sealed to adjoining stator elements. For example, the inner band may include a radial mounting flange bolted to an annular inner casing located below the combustor. Bolting effects contact seals between the flange and inner casing, however, the bolting restrains thermal growth of the nozzle elements causing increased thermal stress which affects nozzle life.

Alternatively, the mounting flange may include a retention pin instead of a bolt without the clamping forces associated with the latter which cradle mounts the nozzle segments and permits axial rocking thereof as the outer and inner bands are subject to differential axial thermal expansion and contraction relative to the adjoining supporting elements.

Cradle mounting permits the individual nozzle segments to thermally expand and contract without clamped restraint, and therefore substantially reduces thermal stresses associated therewith.

However, cradle mounting requires suitable features for carrying to the supporting stator elements axial, tangential, and radial loads developed in the turbine nozzle during use. Rocking of the mounting flange must be effected without undesirable vibratory instability and without excessive fretting wear of contact surfaces subject to rocking or pivoting movement. Fretting is a particular concern along circumferential lands through which radial loads are carried between the nozzle and supporting elements. And, undesirable flow leakage through the various contact faces subject to rocking and pivoting, in particular at the retention pins, must be minimized for reducing performance penalties.

Accordingly, it is desired to provide a turbine nozzle mounting reducing fretting wear and contact seal losses.

BRIEF DESCRIPTION OF THE INVENTION

A turbine nozzle includes a row of vanes in corresponding segmented outer and inner bands. The inner band of each segment includes a retention flange. A nozzle support includes forward and aft flanges defining a retention slot receiving the retention flange. The retention flange includes a radial lug trapped axially in the retention slot, and a tangential lug at an opposite circumferential end disposed on the forward flange. The aft flange includes an outer hinge, and the retention flange further includes an inner hinge for cradle mounting the retention flange in the nozzle support.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
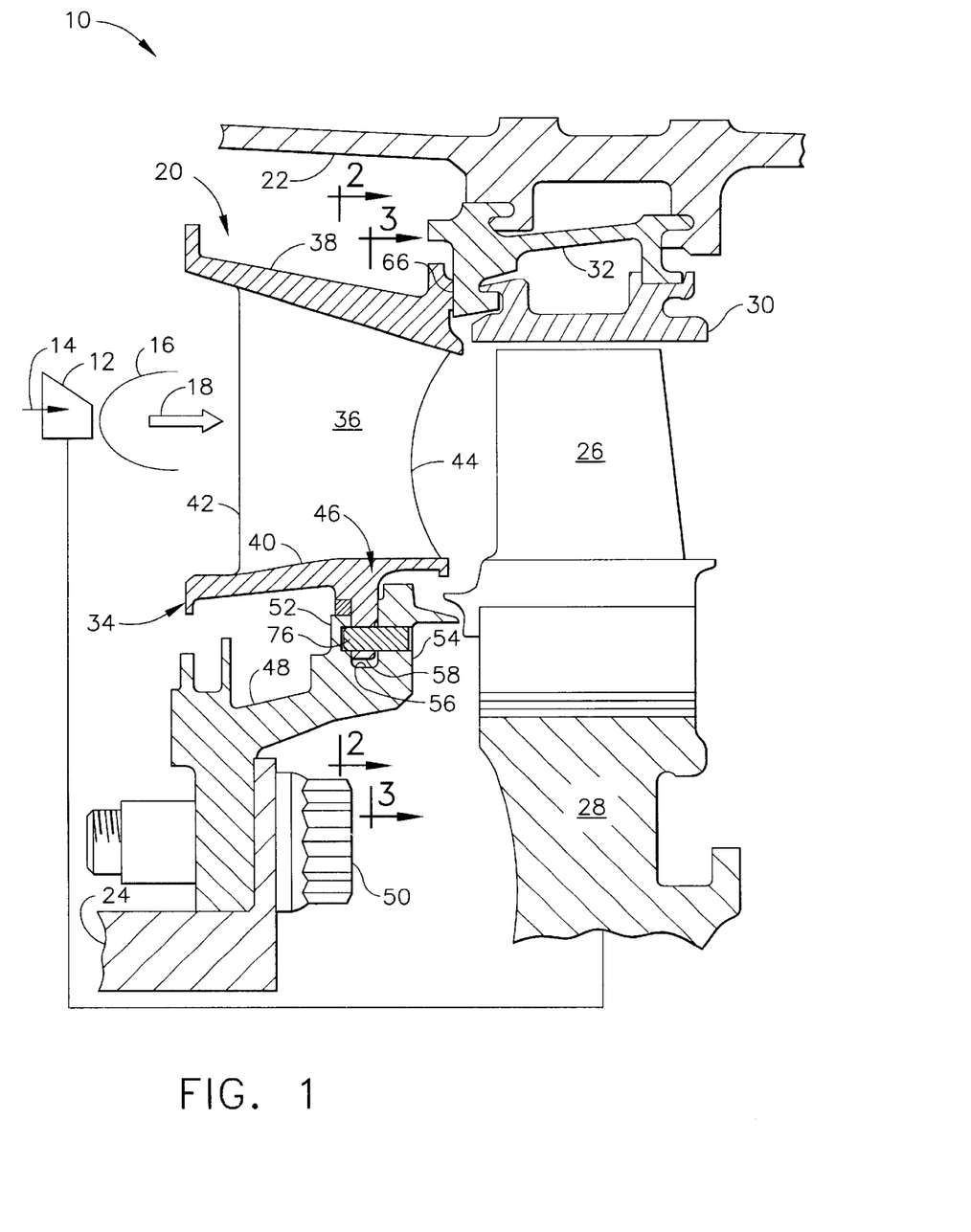
FIG. 1 is an axial sectional view for a portion of a exemplary gas turbine engine including a cradle mounted turbine nozzle in accordance with one embodiment of the present invention.

Illustrated in part schematically in FIG. 1 is a portion of an exemplary gas turbine engine 10 which may be configured in a turbofan aircraft engine application, or for industrial or marine applications as desired. The engine includes a multistage axial compressor 12 conventionally configured for pressurizing air 14 during operation. An annular combustor 16 is disposed downstream from the compressor for receiving the pressurized air therefrom which is mixed with fuel and ignited for generating hot combustion gases 18 which flow downstream.

Disposed directly downstream from the combustor is an annular high pressure turbine nozzle 20 which is suitably mounted between an annular outer casing 22 and annular inner casing 24 shown in part disposed coaxially about the axial centerline axis of the engine.

Disposed downstream from the nozzle 20 is a row of first stage turbine rotor blades 26 extending radially outwardly from the perimeter of a supporting rotor disk 28. The disk 28 is suitably joined to the compressor 12 by a drive shaft extending axially therebetween. Surrounding the tips of the blades 26 is an annular shroud 30 suitably mounted by corresponding hangers 32 to the outer casing 22.

During operation, the combustion gases 18 are suitably directed by the turbine nozzle between the rotor blades 26 which extract energy therefrom for rotating the disk 28 and powering the compressor 12. The combustion gases then flow downstream from the blades 26 into a low pressure turbine (not shown) which extracts additional energy therefrom for either powering a fan disposed upstream of the compressor 12 in a turbofan engine application, or an output shaft for industrial and marine applications.

In accordance with the present invention, the turbine nozzle 20 illustrated in FIG. 1 is cradle mounted to the inner casing 24 for permitting substantially unrestrained thermal expansion and contraction of the components thereof relative to the adjoining supporting elements. And, the cradle mounting of the nozzle is configured for reducing fretting wear of rocking components thereof while minimizing undesirable leakage therebetween.

Figure 2:
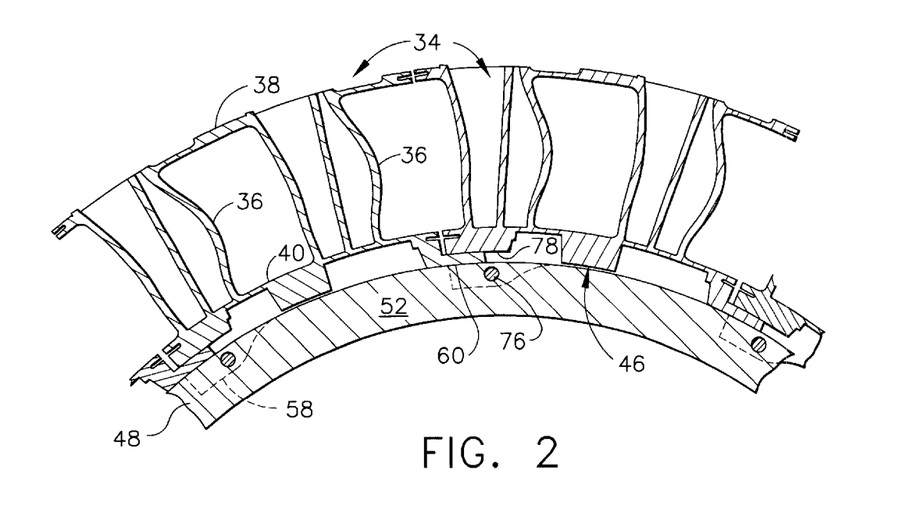
FIG. 2 is a radial sectional view of a portion of the turbine nozzle illustrated in FIG. 1 and taken along line 2—2.

More specifically, the turbine nozzle includes a row of circumferentially adjoining arcuate nozzle segments 34 shown in side sectional view in FIG. 1, and in aft-facing sectional view in FIG. 2.

Each nozzle segment preferably includes a plurality of, typically two, hollow stator vanes 36 extending radially between radially outer and inner arcuate bands 38, 40. As shown in FIG. 1, each vane 36 includes leading and trailing edges 42, 44 at axially opposite ends thereof which extend radially between the two bands, with each vane having an airfoil configuration defined by a generally concave pressure side and circumferentially opposite, generally convex suction side in any conventional configuration for directing the combustion gases as required into the first stage rotor blades 26.

Each nozzle segment is typically an integral or unitary assembly of the bands and vanes, and is typically formed by conventional casting. The individual vanes are typically hollow and open at the inner or outer bands for channeling a portion of the air from the compressor for cooling thereof in a conventional manner during operation.

Figure 3:
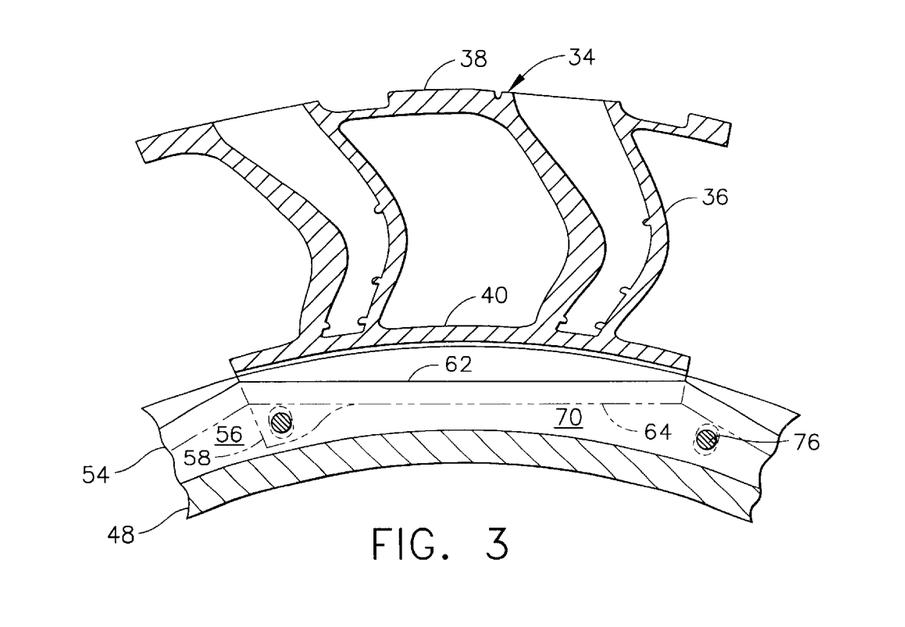
FIG. 3 is a radial sectional view through another portion of the turbine nozzle illustrated in FIG. 1 and taken along line 3—3.

The inner band of each nozzle segment includes an integral radially inwardly extending retention flange 46 as illustrated in FIGS. 1 and 2 for cradle mounting the nozzle segments to the inner casing 24. In particular, an annular nozzle support 48 as shown in FIGS. 1 and 3 is disposed radially inwardly of the row of nozzle segments and is suitably fixedly joined to the inner casing 24 by a row of fasteners 50 in the form of threaded bolts and nuts.

Figure 4:
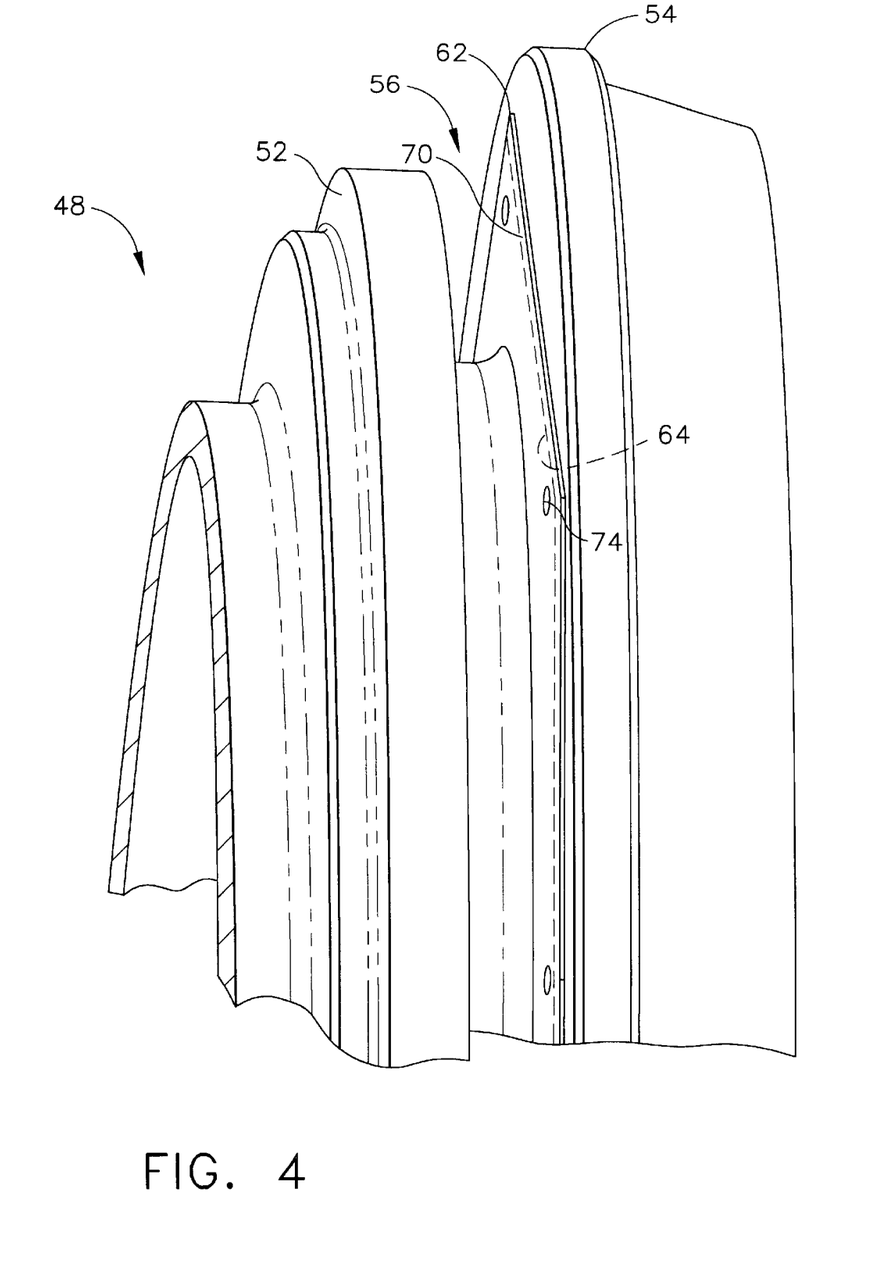
FIG. 4 is an isometric view of a portion of the turbine nozzle support illustrated in FIG. 1 and shown in isolation without the nozzle segments therein.

The nozzle support 48 as shown in FIGS. 1 and 4 is a tubular member disposed coaxially about the axial centerline axis of the engine and turbine nozzle, and is in aft part generally cylindrical. At its aft end, the nozzle support includes radially outwardly extending forward and aft annular flanges 52, 54 spaced axially apart to define an annular retention slot 56 therebetween.

Figure 5:
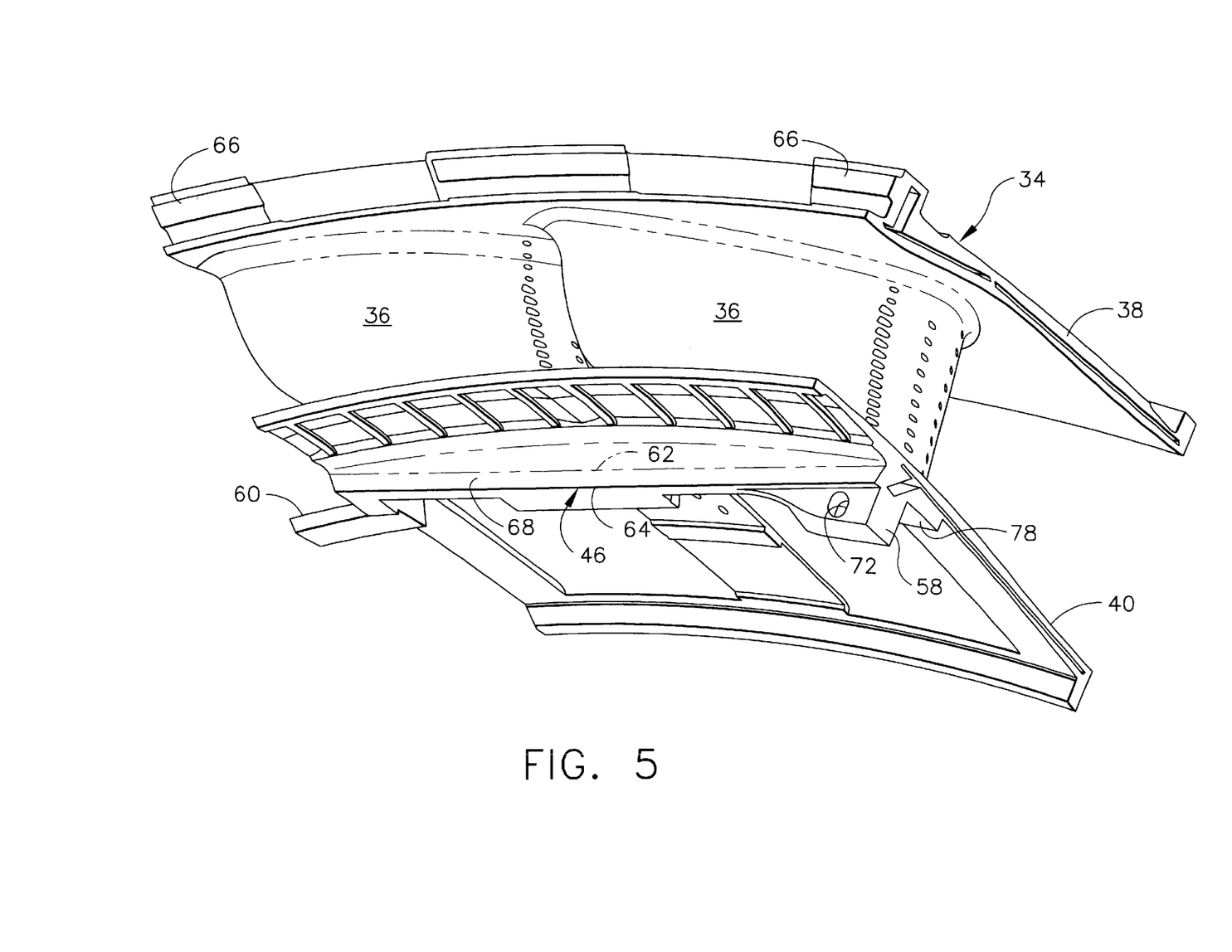
FIG. 5 is an isometric view of an exemplary one of the nozzle segments illustrated in FIG. 1 in isolation from the nozzle support in which they are cradle mounted.

As shown in FIGS. 1 and 5, the retention flange 46 includes a radially inwardly extending radial lug 58 at a first circumferential end thereof which is trapped axially in the retention slot 56. A tangential lug 60 as shown in FIGS. 2 and 5 extends circumferentially outwardly from an opposite second circumferential end of the retention flange, and is disposed or rests on the perimeter of the forward flange 52 defining a radial stop or land for carrying radial loads thereto. As shown in FIG. 5, the opposite circumferential ends of the two bands 38, 40 are flat and include grooves therein for receiving conventional spline seals which seal together the adjoining segments of the turbine nozzle when assembled in a full row.

Figure 6:
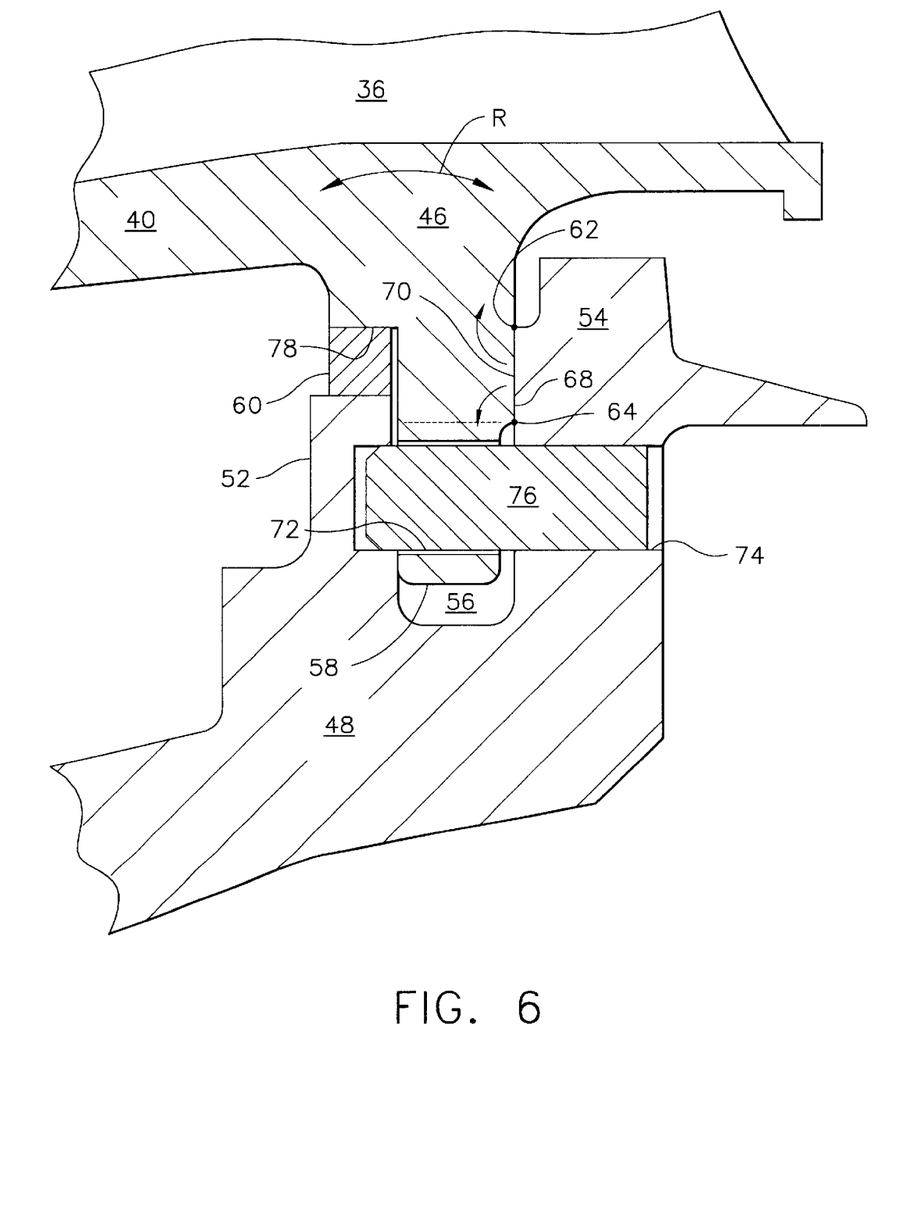
FIG. 6 is an enlarged axial sectional view of the cradle mounting of the nozzle segment inner bands illustrated in FIG. 1.

As shown in FIGS. 4 and 6, the aft flange 54 includes a chordally or tangentially straight radially outer step defining a straight outer pivot or hinge 62. Correspondingly, the retention flange 46 illustrated in FIGS. 5 and 6 includes a chordally or tangentially straight radially inner step defining a radially inner pivot or hinge 64 disposed radially inwardly of the outer hinge, and parallel thereto.

By loosely mounting the retention flange 46 in the corresponding retention slot 56 as illustrated in FIG. 6, each of the nozzle segments may be correspondingly cradle mounted to the nozzle support for permitting rocking or pivoting about alternate ones of the outer and inner hinges 62, 64 due to differential thermal expansion and contraction of the nozzle components during operation.

More specifically, the outer band 38 of each nozzle segment illustrated in FIG. 1 includes a plurality of circumferential spaced apart outer pads 66 facing aft at the aft end thereof for carrying axial loads from the nozzle vanes to the supporting casing 22 through the outer hanger 32, for example. The outer pads 66 simply axially abut corresponding faces of the outer hanger for carrying axial load thereto.

Since the retention flanges 46 of the inner bands are cradle mounted to the nozzle support, and the outer pads of the outer bands simply abut the outer hangers, the individual nozzle segments are permitted to pivot or rock in the axial direction illustrated in FIG. 6, as designated by the double headed rocking arrow R, as the radially opposite ends of the nozzle segments are moved axially due to differential temperatures and corresponding differential thermal expansion and contraction which occurs during operation, in particular during transient operation of the engine.

As shown in FIGS. 5 and 6, the retention flange 46 further includes a flat aft face 68 which extends circumferentially between the opposite circumferential ends thereof, and is disposed radially between the outer and inner hinges 62, 64 when assembled.

As shown in FIGS. 4 and 6, the aft flange 54 includes a flat forward face 70 disposed radially between the outer and inner hinges 62, 64 when assembled for carrying thereto the axial loads from the retention flange.

In the nominal, steady state position illustrated in FIGS. 1 and 6, the two faces 68, 70 abut each other over substantially their entire surface area for carrying axial loads, with a corresponding contact seal therebetween. Similarly, the outer pads 66 illustrated in FIG. 1 abut corresponding faces of the hangers 32 for also carrying axial loads thereto.

However, during transient operation when the outer and inner bands of the nozzle segments are subject to differential axial movement, the corresponding nozzle segments are subject to either clockwise or counterclockwise rocking as illustrated by the arrows in FIG. 6. Clockwise rocking utilizes the outer hinge 62 for maintaining a line of contact between the retention flange and the aft flange while still maintaining a line of sealing. However, the two faces 68, 70 pivot and separate from each other radially inwardly from the outer hinge 62 to the inner hinge 64.

Counterclockwise rocking utilizes the inner hinge 64 for maintaining a line of contact between the retention flange and the aft flange, and a corresponding line of sealing. However, the two faces 68, 70 pivot and are spaced apart from each other radially above the inner hinge 64 to the outer hinge 62. In this way, axial loads are carried between the retention flange and the aft flange at the two hinges 62, 64 and the two faces 68, 70 disposed radially therebetween during steady state operation, and only at the corresponding hinges during transient operation of the engine. Radial loads are carried radially inwardly through the retention flange and the tangential lug 60 into the outer perimeter of the forward flange 52 into the nozzle support 48.

In the configuration illustrated in FIG. 6, the radial lug 58 is trapped axially between the forward and aft flanges. The radial lug includes an axial center aperture 72 extending therethrough which is coaxially aligned with a common aperture 74 extending straight through the aft flange 54 preferably ending part way or blind in the forward flange 52.

The nozzle support further includes a simple retention pin 76 preferably disposed in a press fit or interference fit in the supporting aperture 74, and extending through the lug aperture 72 for carrying tangential loads between the individual nozzle segments and the common nozzle support.

As illustrated in FIG. 5, the lug aperture 72 is preferably oval with straight sides and semi-circular ends having a major or longitudinal axis being substantially perpendicular to the inner hinge 64. As shown in FIG. 6, the oval aperture 72 provides a small clearance in the radial direction between the pin 76 and the radial lug for permitting unrestrained axial rocking of the nozzle segment during differential thermal movement. However, the circumferential or side clearance between the pin and oval aperture 72 is as small as practical so that the radial lug contacts either side of the retention pin for carrying the tangential loads without excessive movement of the radial lug.

In the preferred embodiment illustrated in FIG. 6, the lug aperture 72 and retention pin 76 are collectively disposed radially inwardly of the inner hinge which isolates the apertures from the hinges and contact faces 68, 70 which provide sealing during operation. In this way, the lug aperture 72 does not provide a leakage path which would adversely affect sealing performance of the two hinges and cooperating contact faces.

As shown in FIGS. 2 and 5, the tangential lug 60 extends circumferentially outwardly from the flat end face of each inner band in a cantilever fashion. Correspondingly, the retention flange 46 further includes a generally L-shaped nesting notch 78 at the first circumferential end thereof disposed in front of the radial lug 58. The notch 78 defines a cooperating radial land sized for receiving the tangential lug 60 from the adjoining nozzle segment as shown in FIGS. 2 and 6 for carrying the radial loads to the perimeter of the forward flange 52. Accordingly, the mating lug 60 and notch 78 are offset axially forward from the radial lug as illustrated in FIG. 6.

As the combustion gases 18 flow through the nozzle segments illustrated in FIG. 1, the nozzle is pushed aft for engaging the outer pads 66 with the hangers 32, and engaging the corresponding faces 68, 70 of the retention flange and aft flange. In the tangential direction illustrated in FIG. 2, the nozzle segment is pushed from the right to left, with the retention pin 76 restraining the tangential loads upon contact from the right by the radial lug.

The resultant moment of this tangential load causes the nozzle segment to rotate counterclockwise in FIG. 2, and the tangential lug 60 is prevented from rotating radially outwardly by the downward force of the nesting notch 78. The resulting loaded system is stable and capable of allowing the nozzle segment to axially rotate or rock during transient engine excursions where the outer support hanger 32 moves axially at a different rate than the inner support 48. During nozzle rocking, both the outer and inner bands remain in contact with the outer hanger 32 and aft flange 54 as described above notwithstanding cradle movement about the outer or inner hinges 62, 64.

Cradle rocking of the retention flange at the two hinges 62, 64 illustrated in FIG. 6 also results in cradle rocking at the tangential lug 60 and its mating notch 78. In the preferred embodiment illustrated in FIG. 6, the forward flange 52 has an outer perimeter sized in outer diameter for being disposed radially outwardly of the inner hinge 64 and radially inwardly of the outer hinge 62. In this way, the rocking interface between the tangential lug 60 and forward flange 52 is very close to being in line with the two chordal hinges 62, 64.

Accordingly, there is a relatively low moment arm associated with cradle rocking of the retention flange which results in a correspondingly low dragging shear force between the radially contacting faces of the tangential lug 60 and the forward flange 52. The reduced dragging shear force correspondingly reduces fretting wear for further improving the useful life of the nozzle segments.

As shown in FIG. 6, the radial lug 58 is suitably axially thinner than both the retention slot 56 and the outer portion of the retention flange 46 at the aft face 68. In this way, the radially inwardly extending radial lug 58 does not contact either the forward or aft flanges below the inner hinge 64 during cradle rocking movement.

In the preferred embodiment illustrated in FIGS. and 1 and 5, each of the nozzle segments preferably includes only a single radial lug and a single cooperating retention pin 76 extending therethrough. In this way, each nozzle segment is radially retained at one circumferential end by the pin-mounted radial lug, and radially retained at the opposite circumferential end by its tangential lug and the mating notch 78 of the adjoining nozzle segment. This configuration enjoys stable operation of the cradle mounted configuration during steady state and transient operation of the engine.

As shown in FIG. 2, each of the nozzle segments 34 preferably rests radially on the common forward flange 52 solely at the mating tangential lug 60 and nesting notch 78 at opposite circumferential ends of the retention flange for carrying the radial loads into the nozzle support.

Correspondingly, the retention flange 46 as illustrated in FIG. 5 has a flat radially inner surface extending circumferentially between the radial lug 58 and tangential lug 60 which is otherwise unsupported radially for minimizing weight. However, the inner hinge 64 extends along the bottom of the retention flange in the form of a blunt corner which transitions into the step recessed along the radial lug.

The cradle mounted turbine nozzle disclosed above reduces the likelihood of fretting wear at the radial stop surfaces of the retention flange by positioning the inner hinge 64 for minimizing the moment arm relative to the radial stop provided by the perimeter of the forward flange. Rocking travel is thusly reduced for correspondingly reducing fretting wear atop the forward flange. Furthermore, the pin aperture 72 is located below the inner hinge 64 for eliminating any leakage path between the forward and aft sides of the retention flange during operation. In this way, leakage of cooling air between the opposite ends of the retention flange is reduced to correspondingly increase performance of the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   a row of nozzle segments each including a plurality of vanes extending radially between outer and inner bands, and each of said inner bands includes a radially inwardly extending retention flange, and each of said outer bands includes an outer pad facing aft at an aft end thereof for carrying axial loads to an annular supporting casing;
   an annular nozzle support disposed radially inwardly of said nozzle segments and including radially outwardly extending forward and aft flanges spaced apart axially to define an annular retention slot;
   said retention flange including a single radial lug at a first circumferential end trapped axially in said retention slot, and a tangential lug at an opposite second circumferential end disposed on said forward flange for carrying radial loads thereto; and
   said aft flange including a chordally straight outer step defining an outer hinge, and said retention flange further including a chordally straight inner step disposed inwardly of said outer hinge defining an inner hinge for cradle mounting said retention flange in said nozzle support.

2. A nozzle according to claim 1 wherein:
   said radial lug includes an axial aperture extending therethrough aligned with a common aperture in said forward and aft flanges; and
   said nozzle support further includes a single retention pin disposed in said aligned apertures of said radial lug, forward flange, and aft flange for carrying tangential loads therebetween.

3. A nozzle according to claim 2 wherein said retention flange further includes a flat aft face disposed radially between said outer and inner hinges and extending circumferentially between said opposite circumferential ends thereof; and
   said aft flange includes a flat forward face disposed radially between said outer and inner hinges for carrying axial loads thereto.

4. A nozzle according to claim 3 wherein said lug aperture is oval, with a major axis being substantially perpendicular to said inner hinge.

5. A nozzle according to claim 4 wherein said lug aperture and pin are disposed radially inwardly of said inner hinge.

6. A nozzle according to claim 5 wherein said forward flange has an outer perimeter disposed radially outwardly of said inner hinge and radially inwardly of said outer hinge.

7. A nozzle according to claim 6 wherein:
   said tangential lug extends outwardly from said inner band; and
   said retention flange further includes a nesting notch at said first end thereof sized for receiving said tangential lug from an adjoining nozzle segment for carrying said radial loads to said forward flange.

8. A nozzle according to claim 7 wherein each of said nozzle segments rests radially on said forward flange solely at said tangential lug and said nesting notch at opposite circumferential ends of said retention flange for carrying radial loads thereto.

9. A nozzle according to claim 8 wherein said retention flange has a flat radially inner surface extending circumferentially between said radial lug and tangential lug.

10. A nozzle according to claim 9 wherein said radial lug is axially thinner than both said retention slot and retention flange at said aft face thereof.

11. A turbine nozzle comprising:
    a row of nozzle segments each including a plurality of vanes extending radially between outer and inner bands, and each of said inner bands includes a radially inwardly extending retention flange;
    an annular nozzle support disposed radially inwardly of said nozzle segments and including radially outwardly extending forward and aft flanges spaced apart axially to define an annular retention slot;
    said retention flange including a radial lug at a first circumferential end trapped axially in said retention slot, and a tangential lug at an opposite second circumferential end disposed on said forward flange for carrying radial loads thereto; and
    said aft flange including a chordally straight outer step defining an outer hinge, and said retention flange further including a chordally straight inner step disposed inwardly of said outer hinge defining an inner hinge for cradle mounting said retention flange in said nozzle support.

12. A nozzle according to claim 11 wherein:
    said retention flange further includes a flat aft face disposed radially between said outer and inner hinges and extending circumferentially between said opposite circumferential ends thereof; and
    said aft flange includes a flat forward face disposed radially between said outer and inner hinges for carrying axial loads thereto.

13. A nozzle according to claim 12 wherein:
    said radial lug includes an axial aperture extending therethrough aligned with a common aperture in said forward and aft flanges; and
    said nozzle support further includes a retention pin disposed in said aligned apertures of said radial lug, forward flange, and aft flange for carrying tangential loads therebetween.

14. A nozzle according to claim 13 wherein said lug aperture is oval, with a major axis being substantially perpendicular to said inner hinge.

15. A nozzle according to claim 14 wherein said lug aperture and pin are disposed radially inwardly of said inner hinge.

16. A nozzle according to claim 15 wherein:
    said tangential lug extends outwardly from said inner band; and
    said retention flange further includes a nesting notch at said first end thereof sized for receiving said tangential lug from an adjoining nozzle segment for carrying said radial loads to said forward flange.

17. A nozzle according to claim 16 wherein said forward flange has an outer perimeter disposed radially outwardly of said inner hinge and radially inwardly of said outer hinge.

18. A nozzle according to claim 16 wherein each of said nozzle segments includes a single radial lug and a single retention pin extending therethrough.

19. A nozzle according to claim 16 wherein each of said nozzle segments rests radially on said forward flange solely at said tangential lug and said nesting notch at opposite circumferential ends of said retention flange for carrying radial loads thereto.

20. A nozzle according to claim 16 wherein said outer band includes an outer pad facing aft at an aft end thereof for carrying axial loads to an annular supporting casing.

* * * * *